(12) United States Patent
Soin et al.

(10) Patent No.: US 7,562,296 B2
(45) Date of Patent: Jul. 14, 2009

(54) CORRECTION WIDGET

(75) Inventors: Ravipal Soin, Sammamish, WA (US);
Adrian J. Garside, Sammamish, WA (US); David V. Winkler, Seattle, WA (US); Luis M. Huapaya, Bellevue, WA (US); Marieke Iwema, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 100 days.

(21) Appl. No.: 11/189,475

(22) Filed: Jul. 27, 2005

(65) Prior Publication Data

US 2005/0262442 A1 Nov. 24, 2005

Related U.S. Application Data

(63) Continuation of application No. 10/145,425, filed on May 13, 2002, now Pat. No. 6,986,106.

(51) Int. Cl.
*G06F 17/00* (2006.01)
(52) U.S. Cl. .................. 715/268; 715/256; 715/257
(58) Field of Classification Search .......... 715/500, 715/526, 530, 531, 533, 541, 200, 255, 256, 715/257, 268, 273
See application file for complete search history.

(56) References Cited

U.S. PATENT DOCUMENTS

| | | | | |
|---|---|---|---|---|
| 4,829,576 A | * | 5/1989 | Porter | 704/235 |
| 4,866,778 A | * | 9/1989 | Baker | 704/254 |
| 5,331,431 A | | 7/1994 | Jasinski et al. | |
| 5,406,480 A | * | 4/1995 | Kanno | 704/10 |
| 5,502,774 A | | 3/1996 | Bellegarda et al. | |
| 5,513,278 A | | 4/1996 | Hashizume et al. | |
| 5,517,578 A | | 5/1996 | Altman et al. | |
| 5,550,930 A | | 8/1996 | Berman et al. | |
| 5,583,543 A | | 12/1996 | Takahashi et al. | |

(Continued)

FOREIGN PATENT DOCUMENTS

EP 1363229 A2 11/2003

(Continued)

OTHER PUBLICATIONS

Bill Camarda, Using Microsoft Word 97, 1997, Que Corporation, pp. 54-55 and 199-200.*

(Continued)

*Primary Examiner*—Stephen S Hong
*Assistant Examiner*—Gregory J Vaughn
(74) *Attorney, Agent, or Firm*—Birch, Stewart, Kolasch & Birch LLP

(57) ABSTRACT

A correction tool that displays a correction widget when a user acts to correct text is provided. More particularly, if the user places an insertion point in or to the immediate left of the text, or selects the text, the tool displays the correction widget immediately to the left of the selected text. The user can then quickly access a correction interface for correcting the text simply by moving the pointer the short distance from the insertion point to the correction widget. When the user activates the correction widget, the tool displays the correction interface immediately proximal to the correction widget. Thus, the user need only move the pointer a small distance further to then correct the text using the correction interface.

12 Claims, 6 Drawing Sheets

U.S. PATENT DOCUMENTS

| | | | |
|---|---|---|---|
| 5,590,257 A | 12/1996 | Forcier | |
| 5,596,694 A * | 1/1997 | Capps | 345/473 |
| 5,615,378 A * | 3/1997 | Nishino et al. | 704/4 |
| 5,649,027 A | 7/1997 | Mahajan et al. | |
| 5,659,771 A | 8/1997 | Golding | |
| 5,666,139 A | 9/1997 | Thielens et al. | |
| 5,682,439 A | 10/1997 | Beernink et al. | |
| 5,710,916 A | 1/1998 | Barbara et al. | |
| 5,715,469 A | 2/1998 | Arning | |
| 5,717,939 A | 2/1998 | Bricklin et al. | |
| 5,764,799 A | 6/1998 | Hong et al. | |
| 5,787,455 A | 7/1998 | Seybold | |
| 5,802,388 A | 9/1998 | Zetts et al. | |
| 5,812,697 A | 9/1998 | Sakai et al. | |
| 5,841,901 A | 11/1998 | Arai et al. | |
| 5,850,480 A | 12/1998 | Scanlon | |
| 5,855,000 A | 12/1998 | Waibel et al. | |
| 5,870,702 A | 2/1999 | Yamabana | |
| 5,883,986 A | 3/1999 | Kopec et al. | |
| 5,907,839 A | 5/1999 | Roth | |
| 5,956,739 A | 9/1999 | Golding et al. | |
| 5,960,447 A | 9/1999 | Holt et al. | |
| 5,966,464 A | 10/1999 | Kojima | |
| 6,005,973 A | 12/1999 | Seybold et al. | |
| 6,014,460 A | 1/2000 | Fukushima et al. | |
| 6,052,482 A | 4/2000 | Arai et al. | |
| 6,055,333 A | 4/2000 | Guzik et al. | |
| 6,108,445 A | 8/2000 | Uehara | |
| 6,111,985 A | 8/2000 | Hullender et al. | |
| 6,154,579 A | 11/2000 | Goldberg | |
| 6,167,376 A | 12/2000 | Ditzik | |
| 6,185,333 B1 | 2/2001 | Arai et al. | |
| 6,205,261 B1 | 3/2001 | Goldberg | |
| 6,285,785 B1 | 9/2001 | Bellegarda et al. | |
| 6,337,698 B1 | 1/2002 | Keely, Jr. et al. | |
| 6,340,967 B1 * | 1/2002 | Maxted | 345/179 |
| 6,424,743 B1 * | 7/2002 | Ebrahimi | 382/189 |
| 6,438,523 B1 | 8/2002 | Obertcuffer et al. | |
| 6,473,517 B1 | 10/2002 | Tyan et al. | |
| 6,513,005 B1 | 1/2003 | Qin et al. | |
| 6,583,798 B1 * | 6/2003 | Hoek et al. | 715/822 |
| 6,618,697 B1 * | 9/2003 | Kantrowitz et al. | 703/22 |
| 6,701,023 B1 * | 3/2004 | Gaither et al. | 382/254 |
| 6,735,341 B1 * | 5/2004 | Horie et al. | 382/239 |
| 6,782,510 B1 | 8/2004 | Gross et al. | |
| 6,788,815 B2 | 9/2004 | Lui et al. | |
| 6,847,734 B2 | 1/2005 | Hamamura | |
| 6,904,405 B2 | 6/2005 | Suominen | |
| 6,912,498 B2 | 6/2005 | Stevens et al. | |
| 2002/0180689 A1 * | 12/2002 | Venolia | 345/156 |
| 2002/0194223 A1 * | 12/2002 | Meyers et al. | 707/513 |
| 2003/0007018 A1 * | 1/2003 | Seni et al. | 345/864 |
| 2003/0014252 A1 * | 1/2003 | Shizuka et al. | 704/258 |
| 2003/0016873 A1 * | 1/2003 | Nagel et al. | 382/228 |
| 2003/0189603 A1 | 10/2003 | Goyal et al. | |
| 2003/0233237 A1 | 12/2003 | Garside et al. | |
| 2004/0021700 A1 | 2/2004 | Iwema et al. | |
| 2005/0128181 A1 | 6/2005 | Wang et al. | |
| 2005/0135678 A1 | 6/2005 | Wecker et al. | |

FOREIGN PATENT DOCUMENTS

| | | |
|---|---|---|
| EP | 1363232 A2 | 11/2003 |
| EP | 1365349 A2 | 11/2003 |
| JP | 63095590 | 4/1988 |
| JP | 04290184 | 10/1992 |
| JP | 63095590 | 4/1998 |

OTHER PUBLICATIONS

OCR Master User's Guide, published by Microforum, 1997, pp. 3-6, 3-7, 3-14, 3-15, and 5-2-5-5.

Baran, Nicholas, "Rough Gems: First Pen Systems Show Promise, Lack Refinement," Byte, Apr. 1992, pp. 212-222.

Zhao, R., et al., "Pen-based Interfaces in Engineering Environments," Symbiosis of Human and Artifact, Elsevier Science B.V., 1995, pp. 531-536.

Leedham, C.G., "Historical Perspectives of Handwriting Recognition Systems," IEEE, 1994, pp. 1-3.

Suhm, Bernard, et al., "Model-based and Empirical Evaluation of Multimodal Interactive Error Correction," ACM Transactions on Computer-Human Interaction, May 1999, pp. 584-591.

Kutich, Karen, "Techniques for Automatically Correcting Words in Text," ACM Computing Surveys, vol. 24, No. 4, Dec. 1992, pp. 377-439.

Grasso, Michael A., et al., "The Integrality of Speech in Multimodal Interfaces," ACM Transactions on Computer-Human Interaction, vol. 5, No. 4, Dec. 1998, pp. 303-325.

Trabelsi, Zouheir, et al., "A Voice and Ink XML Multimodal Architecture for Mobile eCommerce System," ACM, Sep. 2002, pp. 100-104.

Bandoh, Hirokazu, et al., "User Interfaces for Correcting Errors in Writing Box-free Recognition of Handwritten Text," Department of Computer, Infromation and Communication Sciences, Tokyo University of Agriculture and Technology, vol. 43, No. 6, Jun. 2002, pp. 1996-2005.

Nicholas Baran, "Rough Gems: First Pen Systems Show Promise, Lack Refinement," *Byte*, Apr. 1992, pp. 212-222.

R. Zhao et al., "Pen-based Interfaces in Engineering Environments," *Symbiosis of Human and Artifact, Elsevier Science B.V.*, 1995, pp. 531-536.

C.G. Leedham, "Historical Perspectives of Handwriting Recognition Systems," *IEE*, 1994, pp. 1-3.

Bernard Suhm et al., Multimodal Error Correction for Speech User Interfaces, ACM *Transactions on Computer-Human Interaction*, vol. 8, No. 1, Mar. 2001, pp. 60-98.

Bernard Suhm et al., "Model-baed and Empirical Evaluation of Multimodal Interactive Error Correction," *ACM Transactions on Computer-Human Interaction*, May 1999, pp. 584-591.

Karen Kukich, "Techniques for Automatically Correcting Words in Text," *ACM Computing Surveys*, vol. 24, No. 4, Dec. 1992, pp. 377-439.

Michael A. Grasso et al., "The Integrality of Speech in Multimodal Interfaces," *ACM Transactions on Computer-Human Interaction*, vol. 5, No. 4, Dec. 1998, pp. 303-325.

Zouheir Trabelsi et al., "A Voice and Ink XML Multmodal Architecture for Mobile e-Commerce System," *ACM*, Sep. 2002, pp. 100-104.

Hirokazu Bandoh et al., "User Interfaces for Correcting Errors in Writing-box-free Recognition of Handwritten Text," *Department of Computer, Information and Communication Sciences*, Tokyo University of Agriculture and Technology, vol. 43, No. 6, Jun. 2002, pp. 1996-2005.

Bill Camarda, Using Microsoft Word 97, 1997, Que Corporation, pp. 54-55 and 199-200.

Wolfgang Hürst et al., "Error Repair in Human Handwriting—An Intelligent User Interface for Automatic On-Line Handwriting Recognition," IEEE Joint Symposia on Intelligence and Systems, pp. 389-395 (1998).

Ivan Poupyrev et al., "Virtual Notepad: Handwriting in Immersive VR," IEEE Virtual Reality Annual International Symposium, Mar. 14-18, 1998, pp. 126-132.

L. Schomaker, "From Handwriting Analysis to Pen-Computer Applications," Electronics and Communication Engineering Journal, vol. 10, No. 3, pp. 98-102 (1998).

* cited by examiner

Every clog has his day.
301   301a
Figure 3

Every clog has his day.
403  405  401
301   301a
Figure 4

Every clog has his day.
503  501  401
301   301a
Figure 5

CORRECTION WIDGET

CROSS REFERENCE TO RELATED APPLICATION

This application is a continuation of prior U.S. application Ser. No. 10/145,425, filed May 13, 2002, the entire contents of which are incorporated herein by reference.

FIELD OF THE INVENTION

The present invention relates to a user interface that allows a user to easily correct text recognized from a natural input technique. More particularly, the invention relates to a graphical object for accessing a correction interface and the correction interface accessed through the graphical object.

BACKGROUND OF THE INVENTION

As computers become more and more integrated into our modern society, there is a growing need for tools that will allow a user to efficiently enter data into a computer. Some of the most desired input tools are those that allow a user to enter data using natural input techniques rather than typing on a physical or software QWERTY keyboard. These natural input techniques, which include handwriting and speech, offer users the promise of a familiar and convenient method of creating data that requires no special skills. To this end, great strides have been made in developing software applications that recognize text from such natural input. For example, some voice recognition applications will accurately transcribe text from a user's speech. Similarly, some handwriting recognition applications will recognize text from both block print and cursive handwriting.

One important advantage to these natural input techniques is that they potentially offer users a much higher throughput than entering data through a keyboard. The typical user can speak considerably faster than he or she can type. Thus, a user can quickly input text by speaking words that would have otherwise taken much longer to input by typing on a keyboard. Likewise, if a user has not memorized the position of keys on a QWERTY keyboard, that user may be able to handwrite words with a stylus and a digitizer faster than he or she can type those words on a keyboard.

While natural input offers the potential for high throughput in theory, in actuality the inherent inaccuracies of natural input can significantly reduce that potential. For example, a user may dictate voice input that initially is translated into text at a rate of 120 words per minute. After the user proofreads and corrects any errors in the recognized text, however, the user's actual throughput may drop to only 80 words per minute or less. Typed text generally has a few typographical errors, but text recognized from speech or handwriting usually will contain many errors as a result of inaccurate recognition. To compound this drawback, conventional natural input correction methods for correcting these errors are time consuming.

A conventional natural input correction method typically requires a user to first move a pointer to select the text to be corrected. Next, the user must move the pointer to a command button at a different location, such as a button on a toolbar, in order to retrieve a menu listing alternate selections for the inaccurately recognized text. The user must then move the pointer to still a third location to select the correct alternate selection on the alternates list. Because the user must continuously move the pointer from the text to a command button and then to an alternate list, the user suffers a significant delay in correcting even a single inaccurately recognized word. Thus, the very process of correcting text recognized from natural input may substantially reduce the throughput of that natural input technique. Correspondingly, any reduction in the speed of the correction process will help increase the throughput for natural input and generally improve the user's experience for natural input. Accordingly, there is a need for a natural input correction tool that allows a user to quickly and efficiently correct text.

SUMMARY OF THE INVENTION

Advantageously, the correction widget tool according to the invention allows a user to correct text with only a minimal amount of pointer movement. The correction widget tool displays a graphical object, hereafter referred to as correction widget, when a user acts to correct text. More particularly, if the user places an insertion point in or to the immediate left of the text, or selects the text, the tool displays the correction widget immediately to the left of the selected text. The user can then quickly access a correction interface for correcting the text simply by moving the pointer the short distance from the insertion point to the correction widget. When the user activates the correction widget, the tool displays the correction interface immediately proximal to the correction widget. Thus, the user need only move the pointer a small distance further to then correct the text using the correction interface.

BRIEF DESCRIPTION OF THE DRAWINGS

The foregoing summary of the invention, as well as the following detailed description of preferred embodiments, will be better understood when read in conjunction with the accompanying drawings.

FIG. 3 illustrates text that was incorrectly recognized from handwriting input.

FIG. 4 illustrates the initial display of a correction widget in response to a user placing an insertion point in the incorrectly recognized text shown in FIG. 3.

FIG. 5 illustrates the expanded display of a correction widget in response to the user placing a pointer above the active area of the correction widget shown in FIG. 4.

DETAILED DESCRIPTION OF PREFERRED EMBODIMENTS

Overview

The present invention relates to a correction tool for quickly and efficiently correcting text that has been, for example, incorrectly recognized from natural input. A correction tool according to the invention may be implemented with instructions that can be executed on a computing device. Accordingly, an exemplary computing environment for executing such instructions will be described. The components and functions of a correction tool according to the invention will be described in detail as well, along with the correction interface employed by the correction tool and the graphical object provided to access the correction interface.

Exemplary Operating Environment

As previously noted, the text correction tool of the invention may be implemented using software. That is, the correction tool may be described in the general context of computer-executable instructions, such as program modules, executed by one or more computing devices. Generally, program modules include routines, programs, objects, components, data structures, etc. that perform particular tasks or implement particular abstract data types. Typically the functionality of the program modules may be combined or distributed as desired in various embodiments.

Figure 1:
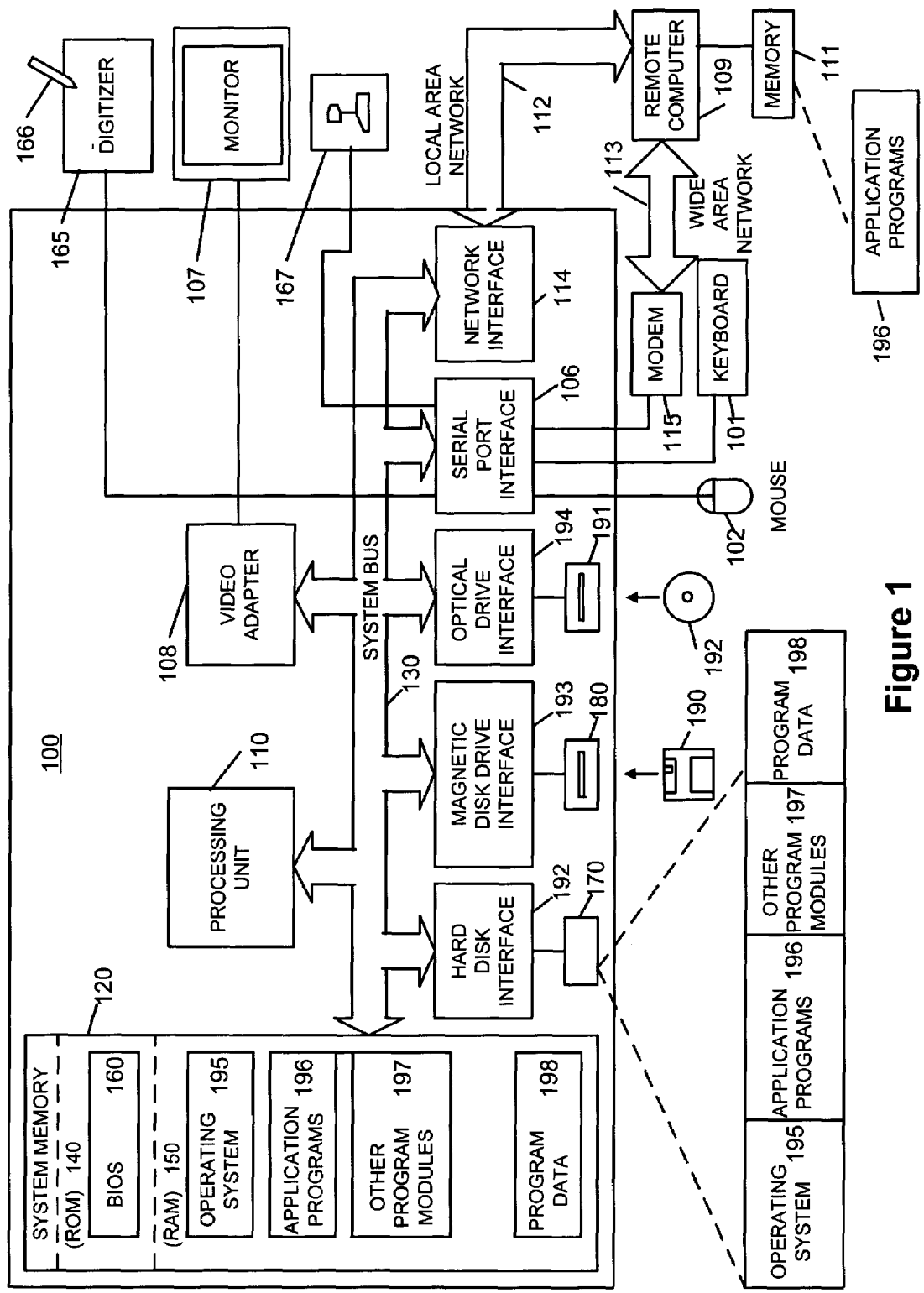
FIG. 1 shows a schematic diagram of a general-purpose digital computing environment that can be used to implement various aspects of the invention.

Because the invention may be implemented using software, it may be helpful for a better understanding of the invention to briefly discuss the components and operation of a typical programmable computer on which various embodiments of the invention may be employed. Such an exemplary computer system is illustrated in FIG. 1. The system includes a general-purpose computer 100. This computer 100 may take the form of a conventional personal digital assistant, a tablet, desktop or laptop personal computer, a network server or the like.

Computer 100 typically includes at least some form of computer readable media. Computer readable media can be any available media that can be accessed by the computer 100. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The computer 100 typically includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150. A basic input/output system 160 (BIOS), containing the basic routines that help to transfer information between elements within the computer 100, such as during start-up, is stored in the ROM 140.

The computer 100 may further include additional computer storage media devices, such as a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100.

Although the exemplary environment described herein employs a hard disk drive 170, a removable magnetic disk drive 180 and a removable optical disk drive 191, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment. Also, it should be appreciated that more portable embodiments of the computer 100, such as a tablet personal computer or personal digital assistant, may omit one or more of the computer storage media devices discussed above.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through various input devices, such as a keyboard 101 and a pointing device 102 (for example, a mouse, touchpad, or pointing stick). As previously noted, the invention is directed to a correction tool that is very useful for correcting text inaccurately recognized from a natural input technique. Accordingly, the computing device will typically also include input devices for accepting natural input. For example, the computer 100 may include a digitizer 165 and a stylus 166, which a user may employ to create handwriting data. The computer 100 may also include a microphone 167, through which a user can input speech information for recognition by a voice recognition process. The computer 100 may also have additional input devices, such as a joystick, game pad, satellite dish, scanner, touch screen, or the like.

These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor 107, personal computers typically include other peripheral output devices (not shown), such as speakers and printers. As will be appreciated by those of ordinary skill in the art, the monitor 107 may incorporate the digitizer 165 so that the input area of the digitizer 165 is coextensive with the display area of the monitor 107. This arrangement conveniently allows a user to employ the stylus 166 to point directly to objects displayed on the monitor 107.

The computer 100 may operate in a networked environment using logical connections to one or more remote computers, such as a remote computer 109. The remote computer 109 may be a server, a router, a network PC, a peer device, or other common network node, and typically includes many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, and thus will not be explained in detail here.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, may be connected to the system bus 130 via the serial port interface 106. In a networked environment, program modules depicted relative to the personal computer 100, or portions thereof, may be stored in a remote memory storage device. Of course, it will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

The Correction Widget Tool

Figure 2:
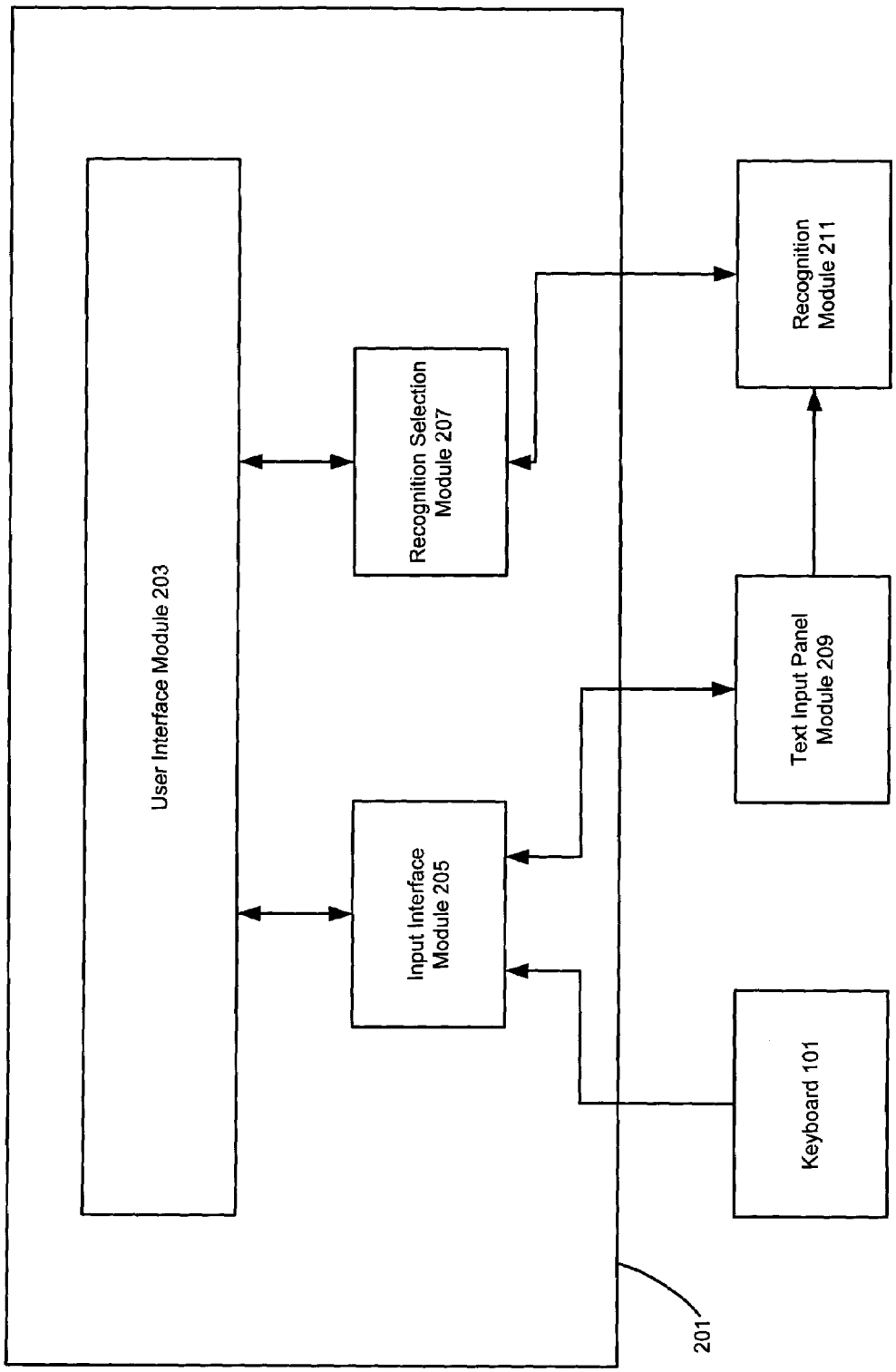
FIG. 2 illustrates components of a correction application employing the correction widget according to an embodiment of the invention.

FIG. 2 illustrates a correction widget tool 201 according to one embodiment of the invention. In this embodiment, the components of the correction widget tool 201 are implemented on a computer 100 as described above. Of course, those of ordinary skill in the art will appreciate that one or more components of the correction widget tool 201 could alternately be implemented using hardware devices. As shown in this figure, the correction widget 201 includes a user interface module 203, an input interface module 205, and a recognition selection module 207. As also illustrated in this figure, the correction widget tool 201 exchanges data with a text input panel module 209, the keyboard 101, and a recognition module 211.

The keyboard 101 allows a user to directly enter text data into the computer 100. When the user depresses a key on the keyboard 101, it sends a first signal identifying the depressed key to the computer 100. The keyboard 101 then sends a second signal to the computer 101 when the user releases the key. The text input panel module 209 also allows a user to enter data into the computer 101, but it provides a user interface for receiving natural input rather than text data. For example, the text input panel module 209 may provide an interface that allows the user to enter data through handwriting. It may additionally or alternately provide a user interface that allows the user to enter speech data through the microphone 167. Still further, the text input panel module 209 may provide an interface that includes a soft keyboard with keys a user may "press" with the stylus 166. In the illustrated embodiment, the text input panel module 209 allows a user to input data through both speech and handwriting.

The recognition module 211 recognizes text data from data that was input through natural input techniques, and thus may include a variety of subcomponents for recognizing speech and/or handwriting. For example, if the computer 100 allows a user to input data through handwriting, the recognition module 211 includes a handwriting recognition process that recognizes the shapes of the handwriting to produce text. Similarly, if the computer 100 allows a user to enter data through speech, the recognition module 211 includes a voice recognition process that recognizes the sounds being spoken by the user and generates text corresponding to those sounds.

As will be appreciated by those of ordinary skill in the art, the recognition module 211 recognizes text from natural input by identifying one or more text objects corresponding to each discrete natural input object from a recognition dictionary. For example, if the natural input object is the handwritten word "dog," the recognition module 211 may identify a list of words in the recognition dictionary that correspond to the shape of the handwritten letters, such as the words "clog," "log," "lag," "log," and "bog." The recognition module 211 then assigns a ranking to each word based upon its correspondence to the natural input, and selects the highest-ranked word to be the text recognized from the natural input. Thus, the recognition module 211 does not typically identify only a single word corresponding to a natural input, but instead identifies a list of alternate words in addition to the selected word recognized from the natural input.

Referring now to the correction widget tool 201, the user interface module 203 graphically displays information to the user, and receives input data provided by the user through, for example, the stylus 166 pressing upon the digitizer 165 or the use of some other pointing device 102. More particularly, as will be discussed in detail below, the user interface module 203 detects when a user designates text for correction by placing an insertion point (that is, a cursor) in or near the text, selects the text, issues a voice command to correct the text, or employs some other technique for designating the text. The user interface module 203 also displays the graphical object or correction widget. Further, the user interface module 203 detects when the user has activated the correction widget, and displays a correction interface that the user may employ to correct the designated text.

As shown in FIG. 2, the input interface module 205 receives input from both the text input panel module 209 and the keyboard 101. Thus, the input interface module 205 can inform the user interface module 203 when the user is using the keyboard 101 to add additional text or modify existing text. Similarly, if the user is adding text through the text input panel module 209, the text input panel module 209 can provide the user interface module 203 with this new text. Still further, the input interface module 205 can initiate the operation of the text input panel module 203, thereby providing the user with an integrated input tool to enter corrected text using both the voice recognition and handwriting recognition techniques.

The Correction Widget

The operation of the correction widget tool 201 shown in FIG. 2 will now be described with reference to the user interfaces shown in FIGS. 3-6, and to the flow chart shown in FIG. 7. Referring first to FIG. 3, this figure illustrates a phrase of text 301 recognized from handwriting input. In this example, the initial handwriting input was "Every dog has its day." As seen in FIG. 3, however, the handwritten word "dog" has been incorrectly recognized as the text "clog" 301a. Thus, a user reviewing the phrase of text 301 would desire to change the text 301*a* from "clog" to "dog." In the illustrated embodiment, the phrase of text 301 is displayed by a target application that has received the text from the recognition module 211. For example, the text 301 may be displayed in a document associated with a word-processing application such as Microsoft® Word by Microsoft Corporation of Redmond, Wash. With various embodiments of the invention, however, the phrase of text 301 alternately may be displayed and corrected in the text input panel module 209 before being delivered to the target application.

To use the correction widget tool 201, in step 701 the user first designates the text 301*a* for correction. With some embodiments of the invention, a user can designate the text 301*a* for correction by placing an insertion point 401 in or to the immediate left of the text 301*a*. As used with regard to the illustrated embodiment, the term "immediate left" refers to the space between the text to be corrected and the preceding text. For example, as shown in FIG. 3, the area immediately to the left of the text 301*a* includes the space between the letter "y" in the word "Every" and the letter "c" in the word "clog" 301*a*. Thus, a user conveniently need not place an insertion point 401 directly within text to select that text. Of course, those of ordinary skill in the art will appreciate that alternate embodiments of the invention may increase or decrease the area defined as immediately to the left of the text for initiating the operation of the correction widget tool 201. Further, still other embodiments of the invention may additionally or alternately allow a user to place an insertion point 401 to the right of text to be corrected in order to begin the operation of the correction widget tool 201.

It should also be noted that, in addition to placing the insertion point 401 in or to the immediate left of text, a user may also designate the text 301*a* for selection by selecting the text. For example, a user may wish to correct adjacent words simultaneously. The user can thus easily initiate the correction widget tool 201 for both words by selecting them in a conventional manner. Of course, with alternate embodiments of the invention, still other triggers can be used to initiate the operation of the correction widget tool 201. For example, some embodiments may initiate the correction widget tool 201 when the user simply positions or hovers a pointer (that is, a graphical object whose location on a display is controlled by a pointing device) over the desired text. As previously noted, the operation of the correction widget tool 201 also may be initiated by voice command. The type of technique employed to initiate the correction widget tool 201 may be independent of the original natural input from which the text 301 was recognized.

In response to the user placing an insertion point 401 in or to the immediate left of the desired text (or selecting the text), the correction widget tool 201 displays a correction widget 403 in step 703. Thus, as shown in FIG. 4, when the user places the insertion point 401 in the text 301*a*, the user interface module 203 displays the correction widget 403.

As shown in FIG. 4, the correction widget 403 is positioned at the upper left-hand side of the text 301*a*. Conveniently, if the user is employing a stylus 166 as the pointing device, this positioning of the correction widget 403 will prevent the display of the correction widget 403 from being blocked by the stylus 166. Of course, the correction widget 403 may be positioned at other locations as desired. For example, if the text 301*a* occurs at the left edge of a document, some embodiments of the invention may place the correction widget 403 to the right of the text 301*a* rather than to its left, so as to remain within the body of the document. Alternately, some embodiments of the invention may provide a position selection feature to allow left-handed users select whether the correction widget 403 appears on the right side of designated text rather than the left side. If the correction widget 403 is displayed in response to the user selecting text that wraps from one line to another line, the correction widget 403 will be position at the upper left portion of the text close to the left edge of the document.

In the illustrated embodiment, the correction widget 403 is initially displayed with a relatively small footprint. More particularly, the L-shaped correction widget 403 shown in FIG. 4 is only 11 pixels wide and 7 pixels high. The small size, coupled with the positioning of the correction widget 403 to the upper left of the text 301*a*, ensures that the correction widget 403 does not obscure the text 301*a*. Moreover, with some embodiments of the invention, the correction widget 403 is positioned to allow the user to place an insertion point 401 between the correction widget 403 and the text 301*a*. The position of the correction widget 403 may also allow the user to place an insertion point 401 between the correction widget 403 and the text immediately preceding the text 301*a*. This arrangement conveniently permits the user to add a letter to the text 301*a* without selecting the correction widget 403.

Of course, with alternate embodiments of the invention, the correction widget 403 may be displayed at other locations relative to the text 301*a*, such as below, above or to the right of the text 301*a*. Further, the correction widget 403 may be displayed with a different shape. For example, the correction widget 403 may alternately be displayed as a squiggle line below or above the text, as a chevron positioned to the left or to the right of the text 301, or as another suitable shape positioned at a convenient location. With most embodiments of the invention, however, it will be desirable to display the correction widget 403 at a position that will not obscure the text 301*a*. As will be apparent to those of ordinary skill in the art, this presentation of the correction widget 403 is similar to that of the Smart Tags employed in software applications such as the Microsoft® Office XP Suite of software applications by Microsoft Corporation of Redmond, Wash. Thus, the display of the correction widget 403 will be familiar to those already using one or more of these software applications.

Under some circumstances, it will not be desirable to display the correction widget 403 even if the user places an insertion point within or to the immediate left of the text 301*a* (or selects the text 301*a*). For example, if the user is typing the text 301*a*, then the insertion point will continuously be in the text 301*a*. Accordingly, with the illustrated embodiment, the keyboard 101 informs the input interface module 205 each time the user presses a key and when the user subsequent releases the key. While the keyboard is being used, the input interface module 205 will prevent the user interface module 203 from displaying the correction widget 403. The correction widget 403 will continue to remain hidden until the user moves the insertion point 401 or selects text for correction.

Similarly, if the user concatenates two different pieces of text into a single piece of text, thereby inadvertently placing the insertion point 401 within the resulting single piece text, the correction widget 403 should not be displayed. Thus, the input interface module 205 will prevent the user interface module 203 from displaying the correction widget 403 between the upstroke and downstroke of a key on the keyboard 101. The correction widget 403 also will not be displayed in an existing document until the user makes a correction to some text within that document.

In order to be unobtrusive, the correction widget 403 will disappear if it is not selected by the user. For example, the correction widget 403 may be configured to disappear if the user does not select the correction widget 403 within a few seconds of its display. With various embodiments of the invention, the user may also actively dismiss the correction widget 403. For example, a user may dismiss the correction widget 403 by activating a designated key on the keyboard 101 such as the "escape" key. Further, the correction widget tool 201 may provide the user with an option of permanently disabling the correction widget 403 from being displayed. Still other embodiments of the invention may provide an option that allows a software developer to prevent the correction widget 403 from being displayed for an application created by the developer. Of course, it will be apparent to those of ordinary skill in the art that various embodiments of the invention may employ other techniques for conveniently allowing the correction widget 403 to be dismissed or prevented from appearing when it is not desired.

If the user wishes to employ the correction widget 403 to correct the text 301*a*, the user subsequently places the pointer 501 over an active region 405 associated with the correction widget 403 in step 705. Typically, when correcting the text 301*a*, the user will have just employed the pointer 501 to place the insertion point 401 within or to the left of the text 301*a*. The pointer 501 will therefore already be very close to the active region 405 of the correction widget 403, requiring only a minimal amount of movement of the pointer 501 by the user. As shown in FIG. 4, the active region 405 of the correction widget 403 is substantially larger than the correction widget 403 itself. For example, the active region 405 may have an area of 11 pixels by 11 pixels. This arrangement conveniently allows the correction widget 403 to be easily selected with a pointer 501 without obscuring either the text 301*a* or the text preceding the text 301*a*.

As shown in FIG. 5, when the user positions the pointer 501 over the active region 405 of the correction widget 403, the user interface module 203 expands the correction widget 403 in step 707 to form expanded correction widget 503. In the illustrated embodiment, for example, the expanded correction widget 503 encompasses an area 20 pixels wide and 16 pixels high. Expansion of the correction widget 403 confirms to the user that he or she has correctly positioned the pointer 501 over the correction widget 403. Next, in step 709, the user selects the correction widget 403. The selection operation may use any conventional technique, such as depressing a selection button provided on the pointing device controlling the position of the pointer 501 (that is, clicking on the expanded correction widget 503). In response to the user selecting the correction widget 403, the user interface module 203 displays a correction interface for correcting the text 301*a* in step 711.

Thus, the correction widget 403 provides convenient access to a correction interface requiring only a minimal amount of movement of the pointer 501 from the user. As discussed above, the reduction in the necessary movement of the pointer significantly increases a user's throughput. It should be noted that, with some embodiments of the invention, the user may dismiss the correction interface simply by selecting the expanded correction widget 503 a second time. With still other embodiments of the invention, the user may dismiss the correction interface by placing the insertion point 401 in a new location.

The Correction Interface

Figure 6:
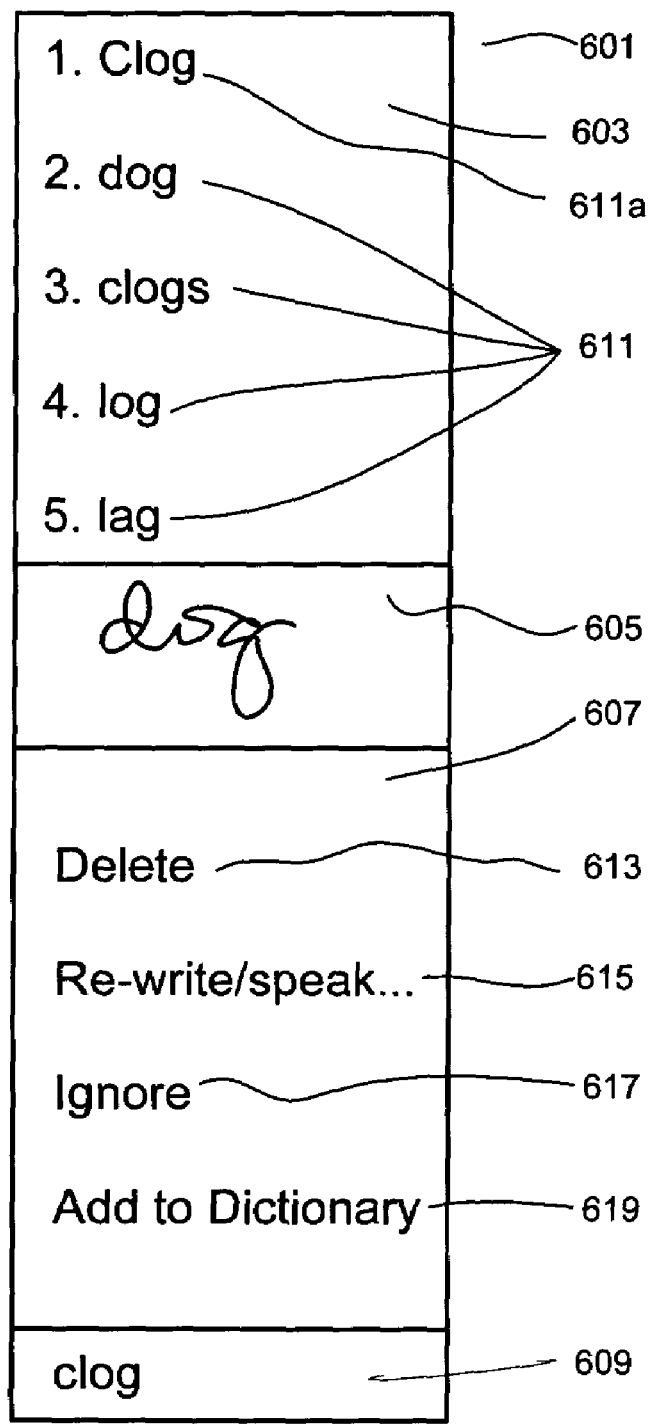
FIG. 6 illustrates a correction interface that is displayed when the user activates the expanded correction widget shown in FIG. 5.
Figure 7:
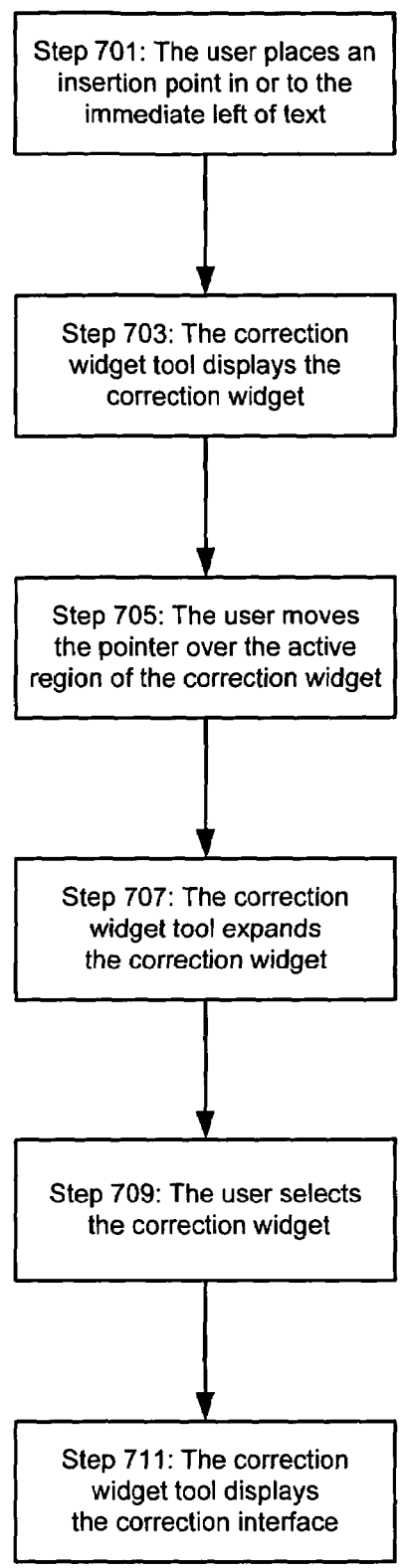
FIG. 7 illustrates a flowchart showing the use of a correction widget according to the invention.

FIG. 6 illustrates a correction interface 601 according to one embodiment of the invention. After selecting the correction widget 403 to display the correction interface 601, the user may employ the correction interface 601 to correct the text 301*a*. As seen in this figure, the correction interface 601 includes an alternate list area 603, and an original input object area 605. The correction interface 601 also includes a command menu area 607 and a selected text area 609.

As previously noted, the correction widget tool 201 may conveniently be used to correct text that was inaccurately recognized from a natural input object. If the text 301*a* was recognized from a natural input object, then the alternate list area 603 will include alternate text choices 611 that also correspond to the natural input object. More particularly, as explained in detail above, when selecting the text 301*a* corresponding to a natural input object, the recognition module 211 may additionally determine a list of one or more alternate text choices that also correspond to the natural input object. Thus, the alternate list area 603 displays the alternate text choices 611 that were the next highest-ranked by the recognition module 211 below the recognized text 611*a* (corresponding to the text 301*a* recognized from the natural input object). If the user determines that one of the alternate text choices 611 accurately corresponds to the natural input object, the user may select that correct one of the alternate text choices 611. In response to the user selecting one of the alternate text choices 611 displayed in the alternate list area 603, the user interface module 203 replaces the text 301*a* (recognized text 611*a*) with the selected one of the alternate text choices 611.

As illustrated in FIG. 6, the alternate list area 603 displays only five text choices including recognized text 611*a* and the alternate text choices 611, regardless of the total number of alternate text choices identified by the recognition module 211 as possibly corresponding with the natural input object. By limiting the number of displayed text choices 611 to a small value, such as a value in the range of 5 to 9, the correction interface 601 significantly reduces the amount of reading time required by the user to identify the accurate text choice. At the same time, by providing more than just one or two alternate text choices 611, the correction interface 601 substantially increases the probability that the correct text choice will be displayed in the alternate list area 603. Of course, with some embodiments of the invention, the alternate list area 603 may include a button, link, or other object for accessing additional alternate text choices 611.

It should also be noted that the initial alternate text choices 611 displayed in the alternate list area 603 may always be the reverse capitalization of the text 301*a*. With handwriting, a handwriting recognition process may have difficulty distinguishing the lower-case form of a letter from its upper-case form. Similarly, a voice recognition process usually will be unable to distinguish between text that should begin with an upper case letter and text that should begin with a lower-case letter. Thus, by providing the reverse capitalization of the text 301*a* as the first one of the alternate text choices 611 displayed in the alternate list area 603, the correction interface 601 allows a user to very quickly correct this common type of recognition error.

With some embodiments of the invention, the order in which the alternate text choices 611 are displayed in the alternate list area 603 may be based upon the confidence that the recognition module 211 has in their accuracy. For example, alternate text choices 611 for which the recognition module 211 has a high level of confidence can be displayed in green, while alternate text choices for which the recognition module 211 has a low-level of confidence can be displayed in red. Of course, the alternate list area 603 can display the alternate text choices 611 according to a variety of different confidence levels. A technique for determining the confidence level of recognized text is disclosed in the copending U.S. patent application Ser. No. 10/120,153, entitled "Assignment And Use Of Confidence Levels For Recognized Text,"

filed on Apr. 9, 2002, and naming Manish Goyal et al. as inventors, which application is incorporated entirely herein by reference.

The original input object area 605 displays the original input object from which the text 301a was recognized. In the example shown in FIG. 6, the original input object was the handwritten word "dog." This conveniently allows the user to review the original input object before correcting the text 301a. With some embodiments of the invention, the original input object area 605 may also serve as a command button for replacing the text 301a with the original input object. Thus, with these embodiments, activating the original input object area 605 would replace the text 301a shown in FIG. 3 with the handwritten word "dog" as displayed in the original input object area 605. If the original input object was a voice input, then the original input object area 605 could be implemented as a button that, when activated, audibly played back the original voice input object.

The command menu area 607 displays various commands for editing the text 301a. For example, in the illustrated embodiment, the command menu area 607 includes the command "delete" 613, which the user may activate to delete the text 301a. The command menu area 607 also includes the command "re-write/speak" 615. When the user activates the re-write speak command 615, the input interface module 205 summons the text input panel 209, and transfers focus from the command menu area 607 to the user interface provided by the text input panel 209. The user can then subsequently write or speak the desired text employing the text input panel 209, and the text input panel 209 will replace the text 301a with the new text entered through the text input panel 209.

The command menu area 607 further includes the command "ignore" 617. This command may be used when, for example, the application in which the text 301a appears has indicated that the text 301a is misspelled or grammatically incorrect, and the user disagrees with the application's assessment. In addition, the command menu area 607 includes the command "add to dictionary" 619. This command may be used when, for example, the text 301a has been recognized from individual handwriting characters or speech phonemes, and does not correspond to one or more specific words in the recognition dictionary. This command adds the text 301a to the recognition dictionary employed by the recognition module 211. It should be noted that, where the recognition module 211 supports both voice and handwriting recognition, activating the command 619 may add the text 301a to both the recognition dictionary for the voice recognition process and the recognition dictionary for the handwriting recognition process. Alternately, the command 619 may add the text 301a to a recognition dictionary shared between the voice recognition process and the handwriting recognition process.

Additional Features And Variations

Figure 8:
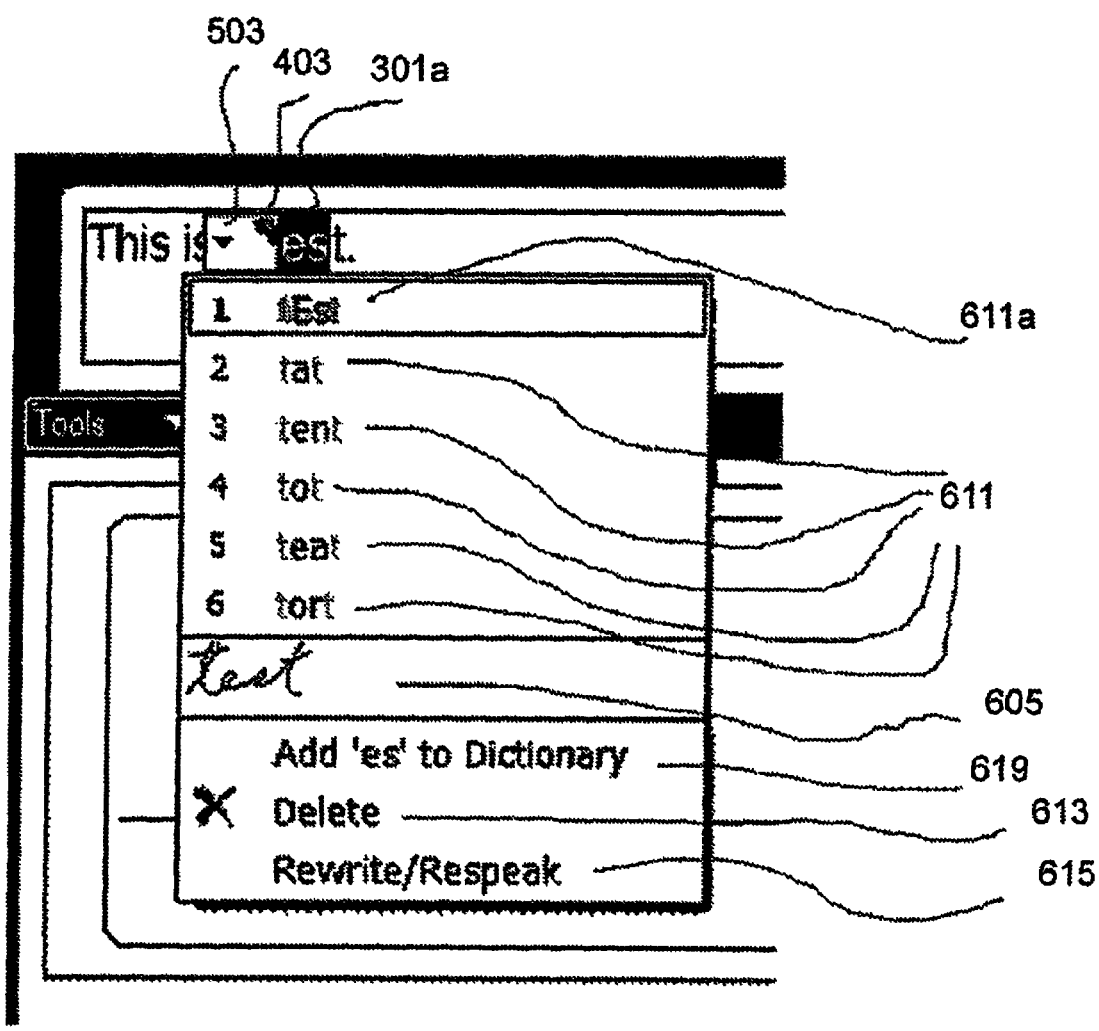
FIG. 8 illustrates another embodiment of a correction interface that can be displayed when the user activates the expanded display of the correction widget shown in FIG. 5 for a partial word correction.

As previously noted, text may be designated for correction by selection. With some embodiments of the invention, however, an entire word of text need not be designated. Instead, the user may select only a portion of a word, as illustrated in FIG. 8. As seen in this figure, the user has selected only the letters "es" in the word "test," to indicate that only these two letters were incorrectly recognized. In response, the correction widget 403 is displayed immediately to the left of the selected text. With some embodiments of the invention, however, the correction widget 403 may be displayed immediately to the left of the entire text 301a.

When the user selects the correction widget 403, the correction widget tool 201 displays the correction interface 601. Unlike the correction interface 601 shown in FIG. 6, however, the alternate list area 603 of the correction interface 601 shown in FIG. 8 displays only alternate text choices 611 that differ from the incorrectly recognize text by the selected letters. Thus, the alternate list area 603 displays only alternate text choices 611 that begin with and end with the letter "t." Moreover, as seen in this figure, the letters in the alternate text choices 611 corresponding to the correctly recognized letters in the designated text 301a are grayed-out, so that the user's attention is immediately drawn to those letters in the alternate text choices 611 corresponding to the incorrectly recognized letters in the designated text 301a.

Thus, the partial word correction feature of the correction widget tool 201 of the invention allows a user to limit the alternate text choices 611 in the alternate list area 603 to those that differ from the recognized text 611a (corresponding to text 301a) only by its incorrectly recognized characters. The correction interface 601 can then quickly filter through alternate text choices 611 that the user has indicated do not correspond to the correct text. This better ensures that the correct text is displayed in the listing of text alternate choices 611. Further, by emphasizing only the letters in the alternate text choices 611 corresponding to the in correctly recognized characters and the designated text 301a, the correction interface 601 allows the user to more quickly identify the correct one of the alternate text choices 611. Of course, with still other embodiments of the invention, the user may alternately, or additionally, select a portion of the text 301a that was accurately recognized, instead of a portion of the text 301a that was incorrectly recognized.

Also, while the correction interface 601 shown in FIG. 8 omits the selected text area 609 found in FIG. 6, with other embodiments of the invention the correction interface 601 may display the selected text area 609. With some of these embodiments, the user may select the entire text 301a to display the correction interface 601. If the correct text choice is not displayed in the alternate list area 603, then the user may select a portion of the designated text 301a contained in the selected text area 609. In response, the selected text area 609 may display only alternate text choices 611 corresponding to the selected portion, such as alternate text choices 611 that differ from the designated text 301a by the selected portion.

The features of the correction widget 403 and the correction interface 601 have been discussed above primarily with regard to the correction of text 301a incorrectly recognized from a natural input object. It should be appreciated, however, that either the correction widget 403 or the correction interface 601 may be used to correct text that was not recognized from a natural input object. In these instances, the correction interface 601 may simply omit the alternate list area 603, the original input object area 605 and the selected text area 609. Alternately, the correction interface 601 may display the alternate list area 603, but include only the reverse capitalization of the text 301a as an alternate text choice.

Further, it should be noted that the correction widget 403 and the correction interface 601 can be used to convert phonetic text into a character in a multi-byte language. As known to those of ordinary skill in the art, a multi-byte language is one that has more characters than can be uniquely identified in a single byte of information. These languages include, for example, Japanese kanji and Chinese characters. Conventionally, a user will employ a non multi-byte language to phonetically describe the sound of a desired multi-byte character, and a conversion application will display one or more multi-byte characters corresponding to that phonetic sound. The correction widget 403 of the invention can be used to access a correction interface 601 displaying a list of multi-byte characters corresponding to a phonetically described sound in a single byte language. Of course, in these embodiments, the correction interface 601 may omit portions that are inapplicable to the recognition of multi-byte characters, or include additional commands or functions that are prepared to the recognition of multi-byte characters. Also, if the correction interface 601 is being used to correct or specify text that are characters in a multi-byte alphabet, then the alternate list area 603 may include a button, link, or other object for accessing additional alternate character choices 611. For example, the alternate list area 603 may include a button that, when activated, expands the length of the alternate list area 603, thereby displaying additional character choices 611.

CONCLUSION

Although the invention has been defined using the appended claims, these claims are exemplary in that the invention may include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention.

For example, the correction widget 403 can be used to access a correction interface other than the correction interface 601. Alternately, the correction interface 601 may be used without the correction widget 403. It is intended that the written description of the invention contained herein covers all such modifications and alterations. For instance, in various embodiments, a certain order to the data has been shown. However, any reordering of the data is encompassed by the present invention. Also, where certain units of properties such as size (e.g., in bytes or bits) are used, any other units are also envisioned.

What is claimed is:

1. A computer-implemented method of correcting electronic text presented on a display comprising:
    displaying and anchoring a graphical object adjacent to the text as a preconfigured correction point, wherein the text has been recognized from a natural input object;
    determining if an active region of the graphical object has been selected, if the active region has been selected, expanding the size of the graphical object, and displaying the expanded graphical object;
    receiving input from a user selecting the expanded graphical object;
    in response to receiving the input from the user selecting the expanded graphical object, displaying a correction interface with a plurality of alternates for correcting the text based at least on common dictionary occurrences for similar character strings and user-specific input common occurrences; and
    providing in an original input object area an original input object from which the text was recognized for updating the original input object with the user-selected graphical object input of at least one occurrence from the plurality of alternates,
    wherein the manner in which the plurality of alternates are displayed is based in part on a confidence level.

2. The computer-implemented method of correcting electronic text recited in claim 1, further comprising:
    displaying the graphical object adjacent to the text in response to receiving input from the user designating the text for correction.

3. The computer-implemented method of correcting electronic text recited in claim 2, further comprising receiving the input from the user designating the text for correction by one of:
    receiving placement of an insertion point within or to the left of the text;
    receiving a selection of at least a portion of the text; and
    receiving a voice command to designate the text.

4. The computer-implemented method of correcting electronic text recited in claim 1, wherein displaying the correction interface includes:
    retrieving one or more recognition alternates corresponding to the natural input from which the text was recognized;
    displaying an alternate list listing the retrieved one or more recognition alternates as alternates; and
    if the user selects one of the alternates on the alternate list, changing the text to the selected alternate.

5. The computer-implemented method of correcting electronic text recited in claim 4, wherein displaying the correction interface further includes displaying a reverse capitalization of the text on the alternate list.

6. The computer-implemented method of correcting electronic text recited in claim 1, wherein
    the original input object from which the text was recognized is handwriting input; and
    the original input object area displays the handwriting input.

7. The computer-implemented method of correcting electronic text recited in claim 1, wherein
    the original input object from which the text was recognized is handwriting input; and
    the original input object area is a button that, when activated, replaces the text with the handwriting input.

8. The computer-implemented method of correcting electronic text recited in claim 7, wherein the button displays the handwriting input.

9. The computer-implemented method of correcting electronic text recited in claim 1, wherein the text is in a multi-byte language, and has been recognized from a phonetic input.

10. The computer-implemented method of correcting electronic text recited in claim 9, wherein displaying the correction interface includes:
    displaying one or more alternate text selections in the multi-byte language; and
    if the user selects one of the alternate text selections, changing the text to the selected alternate text selection.

11. The computer-implemented method of correcting electronic text recited in claim 10, wherein displaying the correction interface further includes displaying an object for accessing additional alternate text selections.

12. A computer-implemented method of correcting electronic text presented on a display comprising:
    displaying and anchoring a graphical object within a user-selected word of text, wherein a user has focused the graphical object upon at least a portion of text for evaluation from a natural input object;
    determining if an active region of the graphical object has been selected, if the active region has been selected, expanding the size of the graphical object, and displaying the expanded graphical object;
    receiving input from a user selecting the expanded graphical object;

in response to receiving the input from the user selecting the expanded graphical object, displaying a correction interface with a plurality of alternates for correcting the text based at least on common dictionary occurrences for similar character strings found within the user-selected word of text; and providing in an original input object area an original input object from which the text was recognized for updating the original input object with the user-selected graphical object input of at least one occurrence from the plurality of alternates, wherein the manner in which the plurality of alternates are displayed is based in part on a confidence level.

* * * * *